US007693641B2

(12) United States Patent
Maruki (10) Patent No.: US 7,693,641 B2
(45) Date of Patent: Apr. 6, 2010

(54) VEHICLE SPEED CONTROL SYSTEM (75) Inventor: Toshimitsu Maruki, Gunma (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 11/106,597

(22) Filed: Apr. 15, 2005

(65) Prior Publication Data

US 2005/0234629 A1 Oct. 20, 2005

(30) Foreign Application Priority Data

Apr. 15, 2004 (JP) .............................. 2004-119698

(51) Int. Cl.
*B60K 31/00* (2006.01)
*B60T 8/32* (2006.01)
*G06F 17/00* (2006.01)

(52) U.S. Cl. .............................. 701/93; 701/58; 701/59; 701/60; 701/61; 701/85; 701/95; 701/96; 180/170; 180/176; 123/350; 123/351; 123/352

(58) Field of Classification Search ............. 701/58–61, 701/85, 93, 95, 96; 180/170, 176; 123/350–352
See application file for complete search history.

(56) References Cited

U.S. PATENT DOCUMENTS

| 4,843,553 | A | * | 6/1989 | Ohata ........................... 701/93 |
| 4,943,923 | A | * | 7/1990 | Naito ........................... 701/93 |
| 4,984,545 | A | * | 1/1991 | Kaneyasu et al. ........... 123/399 |
| 5,195,038 | A | | 3/1993 | Yagi et al. |
| 6,029,107 | A | * | 2/2000 | Sato ............................. 701/58 |
| 6,104,976 | A | * | 8/2000 | Nakamura .................... 701/95 |
| 6,292,737 | B1 | * | 9/2001 | Higashimata et al. ......... 701/96 |
| 6,345,542 | B1 | * | 2/2002 | Suzuki et al. ............. 73/862.09 |
| 6,370,470 | B1 | * | 4/2002 | Yamamura et al. ............ 701/96 |
| 6,389,347 | B1 | * | 5/2002 | Nozaki ......................... 701/54 |
| 6,405,120 | B1 | * | 6/2002 | Higashimata et al. ......... 701/96 |
| 6,482,122 | B2 | * | 11/2002 | Ochiai et al. .................. 477/42 |
| 6,560,522 | B2 | * | 5/2003 | Katakura et al. .............. 701/54 |
| 2002/0082760 | A1 | | 6/2002 | Katakura et al. |

FOREIGN PATENT DOCUMENTS

| EP | 1 048 944 A2 | | 11/2000 |
| JP | 2-124330 A | | 5/1990 |
| JP | 6229883 | * | 8/1994 |
| JP | 07304349 | * | 11/1995 |
| JP | 7-325019 A | | 12/1995 |
| JP | 7325019 | * | 12/1995 |
| JP | 08295152 | * | 11/1996 |
| JP | 2002-014009 A | | 1/2002 |
| JP | 2003-207425 A | | 7/2003 |
| JP | 2003-214990 A | | 7/2003 |

* cited by examiner

*Primary Examiner*—Jack W. Keith
*Assistant Examiner*—Chuong P Nguyen
(74) *Attorney, Agent, or Firm*—Foley & Lardner LLP

(57) ABSTRACT

A vehicle speed control system for controlling a vehicle on a chassis dynamometer is comprised of a controller which is arranged to receive a vehicle speed command, to obtain an anticipated vehicle speed command from the vehicle speed command taking account of a delay factor of a control system of the vehicle, to calculate a driving force a driving force command from the anticipated vehicle speed command, to obtain an accelerator opening command from a previously stored driving force characteristic map based on the driving force command and a detected vehicle speed, and to control an accelerator opening of the vehicle according to the accelerator opening command so as to adjust the detected vehicle at the vehicle speed command.

3 Claims, 5 Drawing Sheets

FIG. 1

FIG.2

US 7,693,641 B2

VEHICLE SPEED CONTROL SYSTEM

BACKGROUND OF THE INVENTION

The present invention relates to a vehicle speed control system applied to a vehicle driven on a chassis dynamometer.

A known vehicle speed control system for a vehicle driven on a chassis dynamometer mainly by a feedback loop tends to be put in a situation that it is difficult to improve a responsibility of a vehicle speed control due to a response delay, a play and a hysteresis of the tested vehicle. In order to obtain a desired vehicle speed control result while overcoming the above situation, it was necessary for an expert engineer to perform an adjustment control using a relative long time period.

In order to solve the above-discussed weakness of the feedback controlled vehicle speed control system, Japanese Published Patent Application No. 7-325019 discloses a feed-forward control method using an inverse function $MG(S)^{-1}$ of a transfer function of a tested vehicle. Further in order to solve an error generated during a period of obtaining the inverse function $MG(S)^{-1}$, there is provided a vehicle model compensation control circuit so as to output a correction command for correcting an accelerator stroke command outputted from the inverse function circuit when a deviation is caused between a vehicle speed command and a vehicle speed. On the other hand, Japanese Published Patent Application No. 2003-213990 discloses another feed-forward control method arranged to compensate an error of a feed-forward control by adding a quantity corresponding to a running resistance of a tested vehicle in a feedback control circuit.

SUMMARY OF THE INVENTION

However, these disclosed methods have encountered with a situation that an error of the engine characteristic data of the feed-forward circuit is amplified by the calculation of a transmission ratio, a differential ratio and a tire radius so as to unexpectedly lower the control accuracy. Therefore, these methods have executed a correcting calculation at the compensation circuit to compensate the lowering of the control accuracy. As a result, the feedback control loop for the correction had a large weight in the vehicle speed control, and therefore the advantage of the feed-forward control has become insufficient. Further, the vehicle test result by these methods has not fitted with a result obtained by the test executed by a test driver, due to the control characteristic of a feedback control loop, such as an overshoot and a response delay.

It is therefore an object of the present invention to provide an improved vehicle speed control system which is capable of obtaining an accurate accelerator opening command so as to remove an error of the feed-forward control, and of executing a vehicle speed control according to various situation.

An aspect of the present invention resides in a vehicle speed control system for controlling a vehicle on a chassis dynamometer, which comprises a feed-forward circuit arranged to receive a vehicle speed command, to receive an anticipated vehicle speed command which is determined taking account of a delay factor of a control system of the vehicle, to calculate a driving force command from the anticipated vehicle speed command, to obtain an accelerator opening command from a previously stored driving force characteristic map based on the driving force command and a detected vehicle speed, and to control an accelerator opening of the vehicle according to the accelerator opening command so as to adjust the detected vehicle speed at the vehicle speed command.

Another aspect of the present invention resides in a vehicle speed control system for controlling a vehicle on a chassis dynamometer, which system comprises a vehicle speed commanding device outputting a vehicle speed command; a vehicle speed command anticipating device outputting an anticipated vehicle speed command based on the vehicle speed command and a delay factor of a control system of the vehicle; and a controller which is arranged to calculate a driving force command from the anticipated vehicle speed command, to retrieve an accelerator opening command from a driving force characteristic map according to the driving force command and a detected vehicle speed, and to control an accelerator opening of the vehicle according to the accelerator opening command so as to adjust the detected vehicle speed at the vehicle speed command.

A further aspect of the present invention resides in a method of controlling a vehicle speed of a vehicle driven on a chassis dynamometer, which comprising the steps of: receiving a vehicle speed command; obtaining an anticipated vehicle speed command which is determined taking account of a delay factor of a control system of the vehicle, based on the vehicle speed command; calculating a driving force command from the anticipated vehicle speed command; retrieving an accelerator opening command from a previously stored driving force characteristic map according to the driving force command and a detected vehicle speed; and controlling an accelerator opening of the vehicle according to the accelerator opening command so as to adjust the detected vehicle speed at the vehicle speed command.

The other objects and features of this invention will become understood from the following description with reference to the accompanying drawings.

DETAILED DESCRIPTION OF THE INVENTION

FIRST EMBODIMENT

Figure 1:
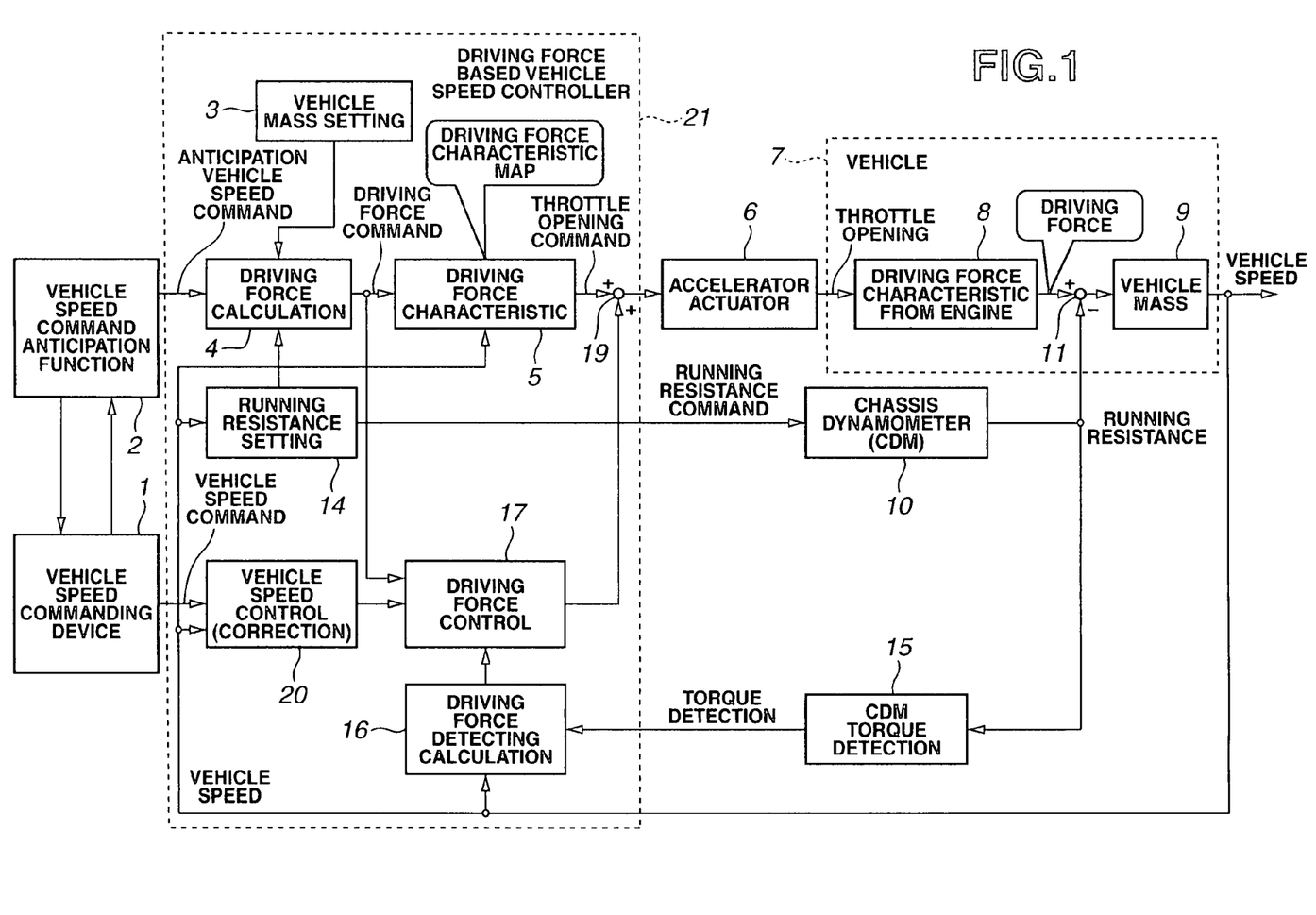
FIG. 1 is a block diagram showing a vehicle speed control system according to a first embodiment of the present invention.

Referring to FIG. 1 there is discussed a first embodiment of a vehicle speed control system according to the present invention. The first embodiment is specifically arranged to execute a vehicle speed control based on a model that a driver manipulates an accelerator a vehicle. This vehicle speed control system is applied to a vehicle 7 tested on a chassis dynamometer (CDM) 10.

FIG. 1 is a block diagram showing a vehicle speed control system of a first embodiment according to the present invention. As shown in FIG. 1, the vehicle speed control system comprises a vehicle speed commanding device 1, a vehicle speed command anticipating section 2, a vehicle mass setting section 3, a driving force calculating section 4 and the driving force characterizing section 5.

The vehicle speed commanding device 1 outputs a vehicle speed command. The vehicle speed command anticipating section 2 calculates and outputs a anticipated vehicle speed command in response to the vehicle speed command, and executes an anticipation of a driving mode of the vehicle taking account of a response delay of the vehicle and a control response delay. The vehicle speed command anticipating section 2 outputs the vehicle speed command at a time advanced to a reference time by a preset time period which is longer than a time period taken for an execution of one step in the driving mode of the tested vehicle, such as a second or less. The vehicle mass setting section 3 sets a vehicle mass of the tested vehicle. The driving force calculating section 4 receives the anticipated vehicle speed command, the vehicle mass and a running resistance of the tested vehicle and calculates a driving force of the tested vehicle from an expression (driving force)=(acceleration command)×(vehicle mass)+(set running resistance), where acceleration command is a differential of the anticipated vehicle speed command. Further the driving force calculating section 4 outputs the obtained driving force as a driving force command to the driving force characterizing section 5 which previously has a driving force characteristic map together. The driving force characterizing section 5 stores the driving force command together with the vehicle speed.

Figure 3:
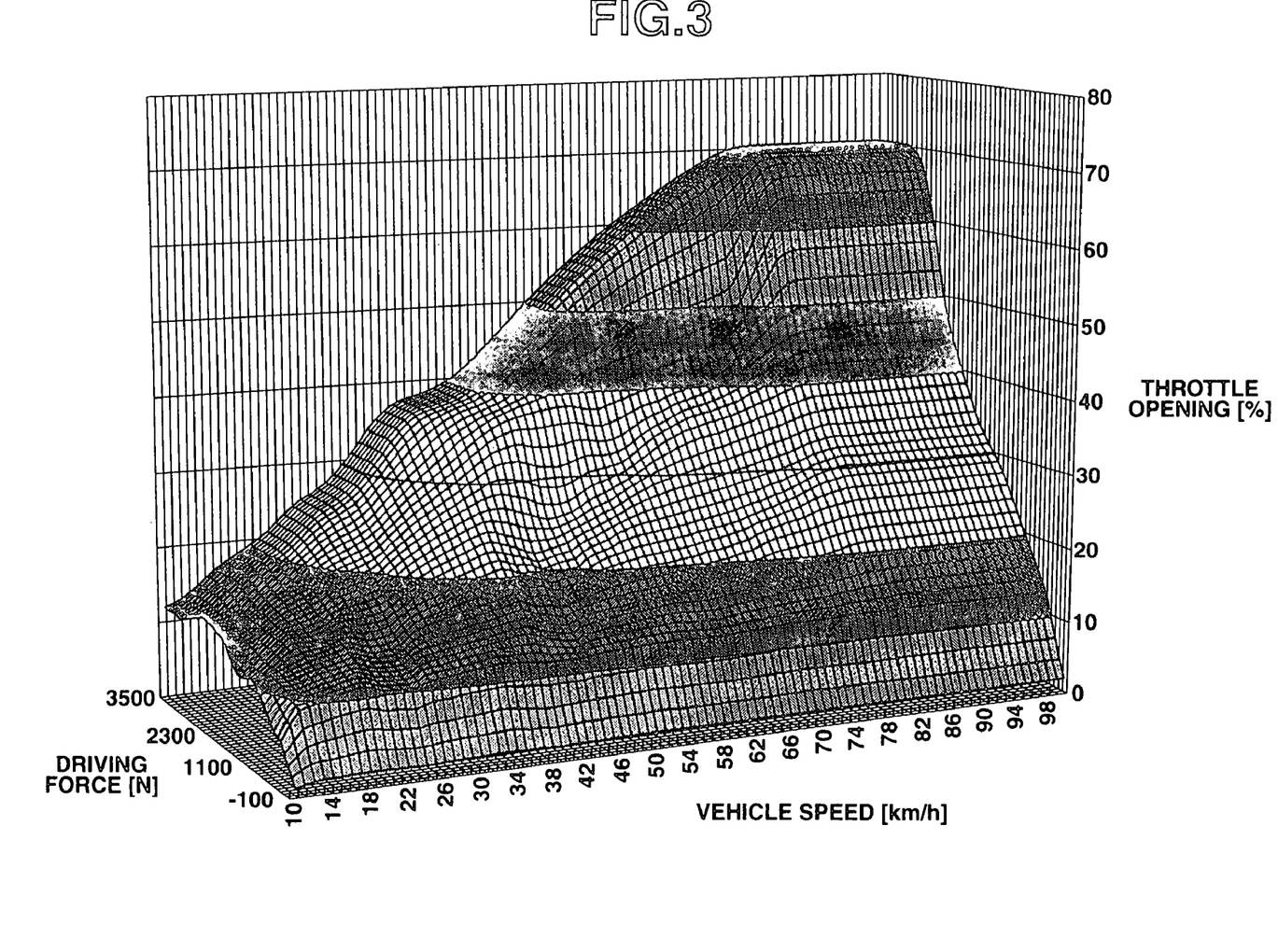
FIG. 3 is a three-dimensional graph showing a driving force characteristic map of the first embodiment.

FIG. 3 shows an example of the driving force characteristic map where an accelerator opening has been determined in response to an intersection of the driving force and the vehicle speed. The driving force characterizing section 5 outputs the accelerator opening determined from the driving force characteristic map, the driving force command and the vehicle speed command, as an accelerator opening command.

An accelerator actuator 6 receives the accelerator opening command and controls an accelerator opening of the tested vehicle 7 according to the accelerator opening command to generate the engine driving force requested in the driving force. The tested vehicle 7 is represented by a driving force characterizing section 8 including the characteristic of an engine of the tested vehicle 7 and a vehicle mass section 9. The chassis dynamometer (CDM) 10 receives the running resistance command from a running resistance setting section 14 and outputs a running resistance indicative signal to the tested vehicle 7. In the test vehicle 7, an acceleration force of the vehicle 7 is calculated at a subtractor by subtracting the running resistance from the driving force obtained at the driving force characterizing section 8. Further, the vehicle speed is achieved from the obtained acceleration taking account of a vehicle mass.

It is necessary to correct various errors such as measurement errors generated during a producing process of the driving force characteristic map. A chassis dynamometer (CDM) torque detecting section 15 detects a torque corresponding to the running resistance. A driving torque detecting section 16 receives the torque detected at the CDM torque detecting section 15 and the vehicle speed of the vehicle 7, and calculates an actual driving force from the torque and the vehicle speed. Further the driving torque detecting section 16 outputs the actual driving force to a driving force controlling section 17. The driving force controlling section 17 receives the driving force command from the driving force calculating section 4 and the actual driving force from the driving force detecting and calculating section 16. A deviation between the driving force command and the actual driving force is inputted to an adding section 19 to correcting the error of the driving force characteristic map.

When the vehicle speed is slightly different from the target vehicle speed, the vehicle speed is slowly corresponded with the target vehicle speed (vehicle speed command) by slowly controlling an accelerator opening through a vehicle speed control loop. Therefore, a vehicle speed control section 20 detects the deviation between the vehicle speed command (target vehicle speed) and the actual vehicle speed and sends the deviation to the driving force controlling section 17 so that the driving force controlling section 17 corrects the driving force. A driving force based vehicle speed controller 21 is constructed by the above discussed sections 3 through 5, 14, 16, 17, 19 and 20.

In this first embodiment, when the vehicle 7 is accelerated according to the target driving mode, an anticipated accelerator opening of achieving the desired acceleration is selected from the driving force characteristic map as a target accelerator opening and an accelerator is directly depressed at a timing of the acceleration according to the driving mode and controlled at the target accelerator opening by the feed-forward control. After the acceleration of the vehicle is terminated, another anticipated accelerator opening of keeping the vehicle speed at a constant vehicle speed is selected from the driving force characteristic map as a target accelerator opening and the accelerator is directly returned to the target accelerator opening by the feed-forward control.

As discussed above, the vehicle speed control system according to the present invention is arranged to execute the anticipation of the vehicle speed command so that the actual driving force corresponds with the reference command while covering the vehicle response delay and the control response delay. When there is a slight deviation between the actual vehicle speed and the target vehicle speed, the accelerator opening is slowly controlled by the vehicle speed control loop so as to cancel the slight deviation. That is, when the vehicle 7 is accelerated, the accelerator opening is directly controlled by the feed-forward control system constructing the vehicle speed control system based on the driving force characteristic. When the vehicle travels at a constant speed or put in a steady state, the vehicle speed is slowly adjusted to the target vehicle speed by the feedback control loop. Accordingly, the vehicle speed control system according to the present invention is arranged to change the control response according to the driving condition of the vehicle 7. Since the previously stored driving force characteristic map includes the measurement error or the like, the vehicle speed control system according to the present invention is arranged to correct the error. More specifically, the vehicle speed control system is arranged to execute the driving force control loop for correcting the driving force characteristic map by comparing the driving force command calculated from the vehicle speed command and the actual driving force. This arrangement is utilized for the correction in the vehicle speed control and the correction of the driving force characteristic map to improve the accuracy of the control and the characteristic map.

Figure 2:
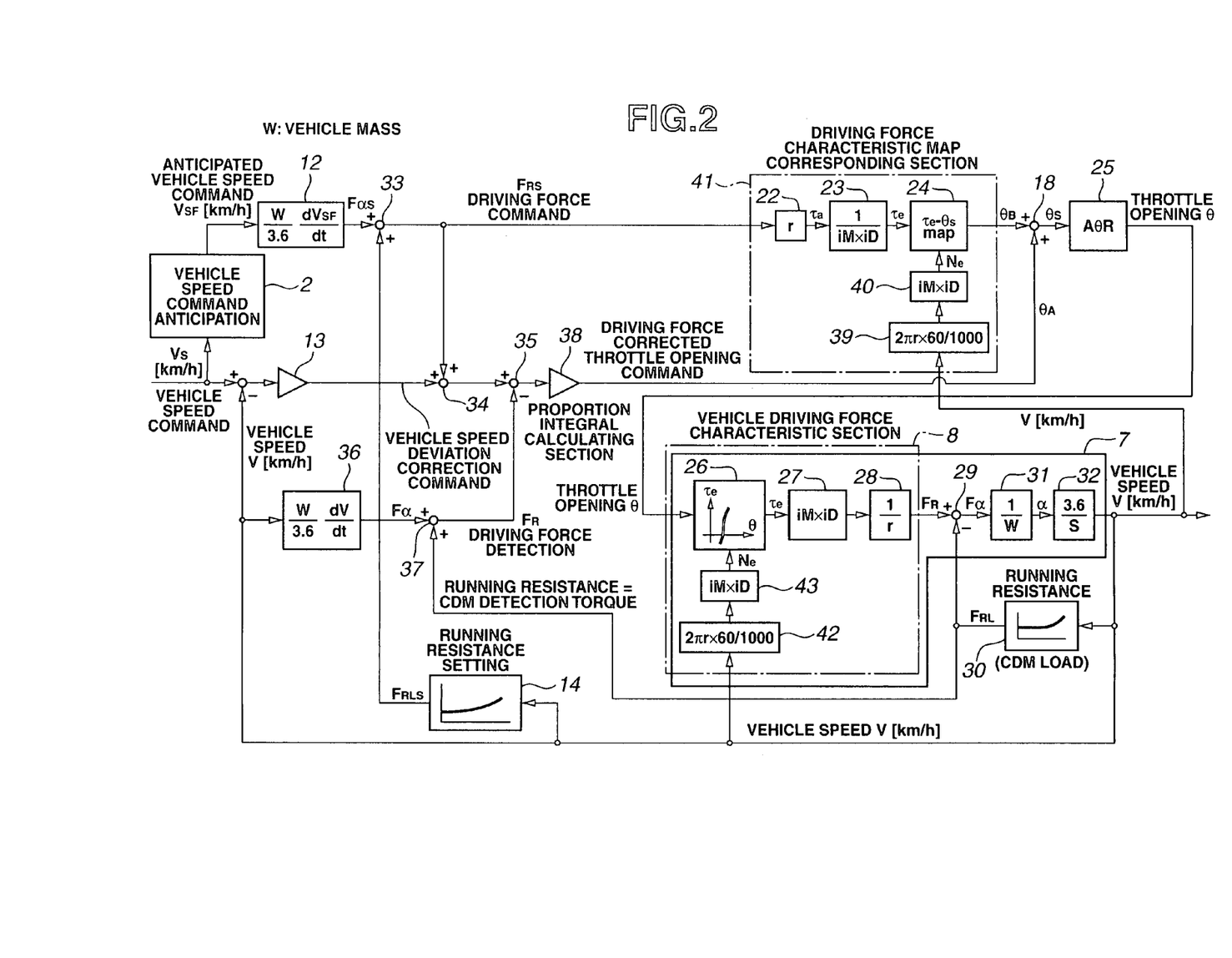
FIG. 2 is a block diagram showing the vehicle speed control system of FIG. 1 in detail.

FIG. 2 is a detailed structural view of the vehicle speed control system shown in FIG. 1 and shows a the difference between a conventional engine characteristic and the driving force characteristic employed in the present invention. The vehicle speed command anticipating section 2 receives the vehicle speed command $V_S$ and outputs the anticipated vehicle speed command $V_{SF}$. An acceleration force calculating section 12 calculates an acceleration force $F_{\alpha S}$ from the differentials of the vehicle mass W and the anticipated vehicle speed command $V_{SF}$. A proportion calculating section 13 amplifies the deviation between the vehicle speed command $V_S$ and the actual vehicle speed V and outputs the deviation as a vehicle speed deviation correction command. A vehicle speed resistance setting section 14 sets a running resistance $F_{RLS}$ according to the vehicle speed V. An adder 33 obtains a driving force command $F_{RS}$ necessary for achieving the target driving mode, by adding the set running resistance $F_{RLS}$ to the acceleration force $F_{\alpha S}$. A driving force characteristic map corresponding section 41 receives the driving force command $F_{RS}$ and the vehicle speed V and outputs an accelerator opening command θB.

An adder 34 corrects the driving force command by adding the vehicle speed deviation correction command to the driving force command. On the other hand, an acceleration force calculating section 36 receives the acceleration force $F_\alpha$ and obtains a detected driving force $F_R$ by adding the acceleration force $F_\alpha$ and the running resistance (chassis dynamometer detection torque $F_{RL}$. A subtracter 35 subtracts the detected driving force FR from the output of the adder 34. An integrator (proportional-plus-integral calculator) 38 obtains a driving-force-correction accelerator opening command $θ_A$ by integrating the deviation obtained at the subtracter 35. An adder 18 adds the driving-force-correction accelerator opening command $θ_A$ to an accelerator opening command $θ_B$ and outputs a corrected accelerator opening $θ_S$. A driving force characteristic map corresponding section 41 is constructed by elements 22 through 24, 39 and 40, and realizes a driving force characteristic map which equivalently activates the functions of the engine characteristic as follows.

A multiplier 22 receives the driving force command $F_{RS}$ and obtains an axle torque $τ_a$ by multiplying the driving force command $F_{RS}$ by a radius r of a tire. A divider 23 receives the axle torque $τ_a$ and obtains an engine output torque $τ_e$ by dividing the axle torque $τ_a$ by a product of a transmission ratio $i_M$ and a differential ratio $i_D$. A stored engine characteristic section 24 receives the engine output torque $τ_e$ and an engine speed $N_e$, produces a characteristic map indicative of a relationship between the engine torque and the accelerator opening using a known learning function and stores the produced map. Further, the stored engine characteristic section 24 retrieves the accelerator opening command (accelerator controller manipulation signal) $θ_B$ from the characteristic map according to the inputted factors and outputs the accelerator opening command $θ_B$ to an adder 18. A multiplier 39 multiplies the vehicle speed V by a constant (2πr×60/1000). A multiplier 40 multiplies the output of the multiplier 39 by the product ($i_T×i_D$) of the transmission ratio $i_T$ and the differential ratio $i_D$ and outputs the product as an engine speed $N_e$ to the stored engine characteristic section 24. An accelerator opening control section 24 receives the corrected accelerator opening command $θ_S$ and outputs the accelerator opening θ.

The accelerator opening θ is inputted to a driving force characteristic section 8 of the vehicle 7. The driving force characteristic section 8 is constructed by an engine characteristic section 26, a multiplier 27, a divider 28 and multipliers 42 and 43. The vehicle 7 is constructed by the driving characteristic section 8, an adder 29, a divider 31 and a multiplier 32. An engine characteristic section 26 includes a map indicative of a relationship between the accelerator opening and the engine output torque and outputs an engine output torque $τ_e$ according to the accelerator opening θ and the engine speed $N_e$. The multiplier 27 receives the engine output torque $τ_e$ and calculates the axle torque $τ_a$ by multiplying the output torque $τ_e$ by the product ($i_T×i_D$). The divider 27 receives the axle torque $τ_a$ and calculates the driving force $F_R$ by dividing the axle torque $τ_a$ by the radius r of the tire. The adder 29 obtains the acceleration force $F_\alpha$ by subtracting the running resistance $F_{RL}$, which is set at a running resistance setting section 30 representing a chassis dynamometer load, from the driving force $F_R$. The divider 31 obtains an acceleration a by dividing the acceleration force $F_\alpha$ by the vehicle mass W. The integrator 32 obtains the vehicle speed by integrate the acceleration α with respect to time. The running resistance setting section 30 receives the vehicle speed V and outputs the running resistance $F_{RL}$ according to the vehicle seed V.

The above-discussed operations of FIG. 2 are similar to those of FIG. 1. In case that the tested vehicle 7 is equipped with an automatic transmission, the accelerator opening command is outputted by using the stored data which represents the driving force characteristic under a driving condition that the vehicle 7 was driven under a D-range condition of the automatic transmission, and the driving force based vehicle speed control is executed on the basis of the obtained acceleration opening command.

SECOND EMBODIMENT

Figure 4:
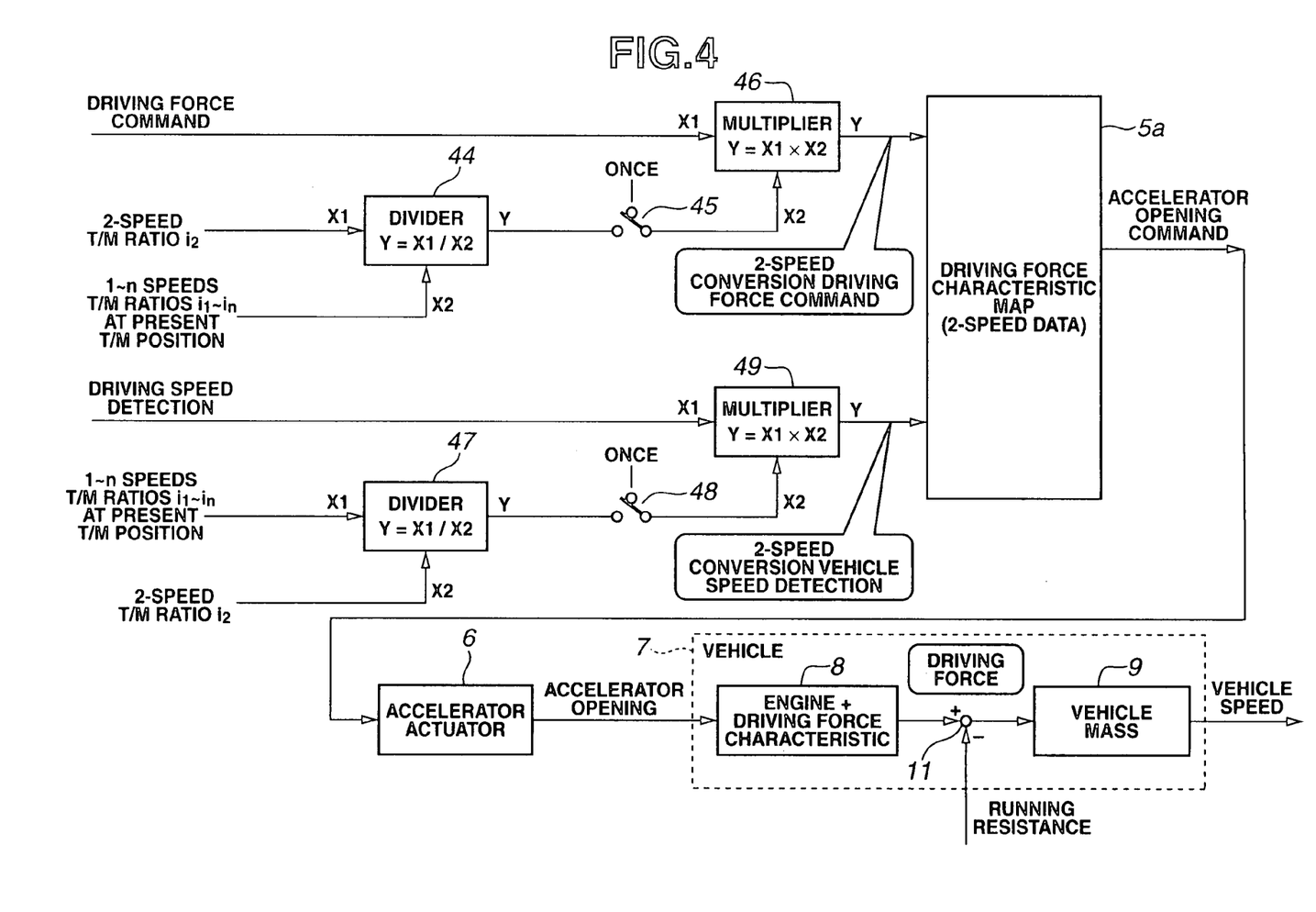
FIG. 4 is a block diagram showing a conversion circuit for converting a driving force command and a detected vehicle speed in the vehicle speed control system of a second embodiment.

FIG. 4 shows a conversion circuit for the driving force command and the detected vehicle speed used in the vehicle speed control system of a second embodiment according to the present invention. A driving force characteristic section 5a uses a driving torque characteristic map stored under a condition that the shift position of the transmission of the vehicle is fixed at second speed. A divider 44 receives the transmission ratio (T/M ratio) $i_2$ at the second speed and a transmission ratio $i_1{}^{-i}{}_n$ at a present shift position, and divides the second-speed transmission ratio $i_2$ by the present-speed transmission ratio $i_1{}^\sim i_n$. The output of the divider 44 is inputted through a selector switch 45 to a multiplier 46. When the vehicle is equipped with a manual transmission, the selector switch 45 connects the divider 44 and the multiplier 46. When the vehicle is not equipped with the manual transmission, the select switch 45 release the divider 44 from the multiplier 46 and send a signal indicative of 1 to the multiplier 46. The multiplier 46 receives the driving force command and the output of the divider 44 or the signal indicative of 1 and multiplies the driving force by the output of the divider 44. Accordingly, the output of the multiplier 46 is a second-speed conversion driving force.

On the other hand, a divider 47 also receives the transmission ratio (T/M ratio) $i_2$ at the second speed and a transmission ratio $i_1{}^\sim i_n$ at a present shift position, and divides the present-speed transmission ratio $i_1{}^\sim i_n$ by the second-speed transmission ratio $i_2$. The output of the divider 44 is inputted trough a selector switch 45 to a multiplier 46. When the vehicle is equipped with a manual transmission, the selector switch 48 connects the divider 47 and the multiplier 49. When the vehicle is not equipped with the manual transmission, the select switch 48 releases the divider 47 from the multiplier 49 sends a signal indicative of 1 to the multiplier 49. The multiplier 49 receives the driving force command and the output of the divider 44 or the signal indicative of 1 and multiplies the driving force by the output of the divider 44. Accordingly, the output of the multiplier 46 is a second-speed conversion driving force.

The other operations following the above-discussed operations of the second embodiment are the same as those of the first embodiment. Further, the other constructions relating to the control of the second embodiment are also the same as those of the first embodiment.

The second embodiment according to the present invention is specifically arranged to use the driving force characteristic map which was stored under a condition the transmission ratio is set at the ratio of the second-speed of the manual transmission. When the shift position of the manual transmission is selected at a speed except for the second speed such as at a first speed or third speed, the driving force command and the detected vehicle speed are converted into a second-speed corresponding driving force command and a second-speed corresponding vehicle speed, and the target accelerator opening command is obtained from the converted driving force command and the converted vehicle speed and the store second-speed engine characteristic map. Accordingly, the vehicle speed control system of the second embodiment according to the present invention basically uses the ratio relative to the second speed transmission ratio without directly employing the calculation executed using the transmission ratio, a differential ratio and the tire radius, which tend to amplify an error of the accelerator opening command in the conventional method. Further, the error of the driving force characteristic is suppressed at a small value. Therefore, it becomes possible to largely improve the accuracy of the vehicle speed control.

THIRD EMBODIMENT

Figure 5:
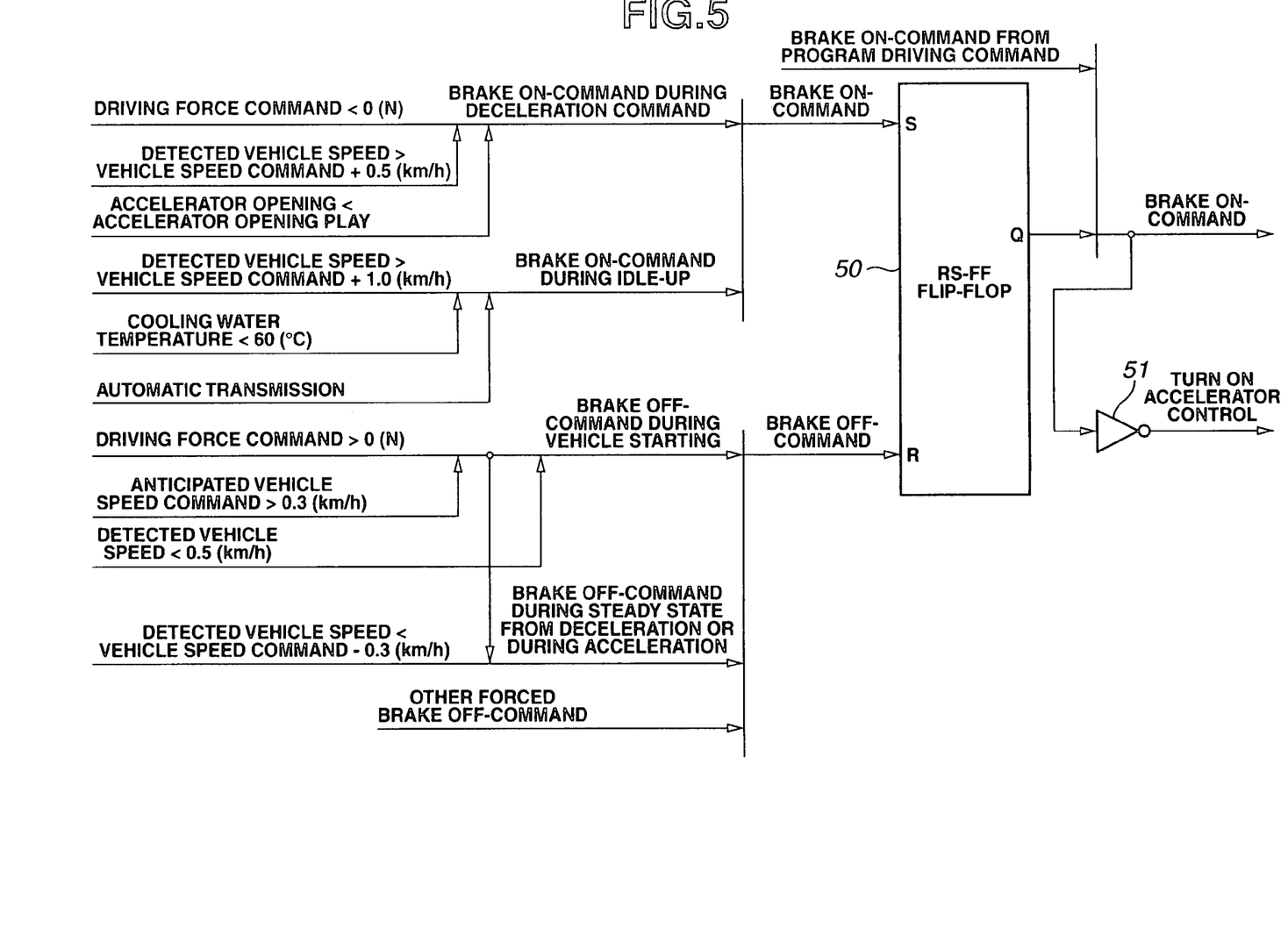
FIG. 5 is a block diagram showing a braking timing automatic determination circuit in the vehicle speed control system of a third embodiment.

FIG. 5 shows a braking timing automatic determining circuit of the vehicle speed control system employed in a third embodiment of the present invention. When the driving force command is minus (of requesting a braking), and the detected vehicle speed is higher than the sum of the vehicle speed command and 0.5 km/h, and the accelerator opening (throttle opening) is smaller than a play (an accelerator is fully closed), the brake on-command during the deceleration command is inputted to an S input terminal of an R-S flip-flop circuit 50 and the brake on-command is outputted from a Q output terminal of the R-S flip-flop circuit 50 so as to execute the brake control. Simultaneously an accelerator control on-command is outputted from a NOT logic circuit 51. In order to ensure a margin in the determination of the braking, 0.5 km/h was added to the vehicle speed command, and the sum of them is compared with the detected vehicle speed. Similarly, the other conditions for the determination of the braking were determined with the respective margins.

On the other hand, when the driving force command is plus and the detecting vehicle speed is lower than the sum of the vehicle speed command and 0.5 km/h and the anticipated vehicle speed command is higher than 0.3 km/h and the detected vehicle speed is lower than 0.5 km/h, that is, when the vehicle speed command becomes higher than the detected vehicle speed, a brake off-command during a vehicle starting is outputted. This brake off-command is inputted to an R input terminal of the flip-flop circuit 50, and the brake on-command is not outputted from the Q output terminal of the flip-flop circuit 50.

Further when the engine of the vehicle is put in a cold condition that a cooling water temperature of the engine is lower than 60° C., that is, when the engine is put in an idle up state, and when the detected vehicle speed is higher than the sum of the vehicle speed command and 1.0 km/h, and when the vehicle is equipped with an automatic transmission (AT), the brake on-command is outputted, and therefore the vehicle speed control using the brake is executed under the vehicle accelerating condition or the normal state. Further, even when the brake on-command is outputted from a programmed operation command, the vehicle speed control using the brake is executed. Further when the driving force command is plus during a period from the deceleration state to the steady state or during an acceleration state and when the detected vehicle speed is lower than the value obtained by subtracting 0.3 km/h from the vehicle speed command, the brake off-command is inputted to the R input terminal of the flip-flop circuit 50 to release the brake.

Further, when the vehicle is automatically stopped or the operation of the vehicle is changed from a manual mode to an automatic mode, that is, when a forced brake off condition is generated, the brake off-command is inputted to the R input terminal of the flip-flop circuit 50.

The vehicle speed control system of the third embodiment according to the present invention comprises the braking timing automatically determining circuit and is arranged to automatically determine the braking timing of the brake control during the vehicle deceleration state from the vehicle operating condition. This arrangement enables a smooth shift from the engine brake using the accelerator to a foot brake.

With the thus arranged embodiments of the vehicle speed control system according to the present invention, since the total driving force is totally measured by the calculating section based on the vehicle specification such as the transmission ratio, the differential ratio and the tire radius and the engine output characteristic section and uses the obtained data as the driving force characteristic data, it becomes possible to accurately obtain the accelerator opening. More specifically, when the vehicle is equipped with an automatic transmission (AT), the slip ratio of a torque converter and the shift timing relative to the required driving force are also stored in the driving force characteristic. Therefore, the accelerator opening is further accurately obtained. Further, by executing the driving mode anticipation upon taking account of the vehicle response delay and the control response delay, it becomes possible to realize the vehicle speed control response without generating a delay to the vehicle speed command.

Further, when the vehicle is equipped with a manual transmission (MT), the driving force characteristic map stored under the specific transmission position is used. If the detected transmission ratio of the tested vehicle is different from that of the stored specific position, the driving force command and the detected vehicle speed are converted to the driving force command and the vehicle speed under the specific transmission position, and the target accelerator opening command is obtained based on the converted driving force command and the converted vehicle speed. Further, as is similar to the case of the AT equipped vehicle, without directly using the transmission ratio, the differential ratio and the tire radius in the calculation process, the accelerator opening is obtained from the ratio of the present selected transmission ratio with the specifically preselected transmission ratio. This arrangement suppresses the error of the driving force characteristic and thereby improving the control accuracy of the vehicle speed control.

Further, since the vehicle speed control system according to the present invention comprises a feedback control loop for correcting the deviation between the driving force command and the detected driving force, it becomes possible to correct the measurement error generated during the storing of the driving force characteristic map.

Furthermore, since the vehicle speed control system according to the present invention is arranged to obtain the accelerator opening command from the driving force command, the vehicle speed and the driving force characteristic map, the accelerator opening command is directly changed from the vehicle speed and the driving force command so as to quickly follow the vehicle speed command when the vehicle speed command is largely changed, and the accelerator opening is slowly adjusted to slowly correspond the vehicle speed with the vehicle speed command when the deviation between the vehicle speed command and the detected vehicle speed is small. This arrangement enables the control similar to the driver's manual control, which realizes a quick response in the radical acceleration and the smooth control in the slowly changing or constant speed condition, so as to adapt to the change of the vehicle operating condition.

Furthermore, since the vehicle speed control system according to the present invention is arranged to obtain the necessary minimum accelerator manipulation quantity for achieving the target driving pattern and to execute the control using the obtained accelerator manipulation quantity, an effective accelerator manipulation is realized. Further, the basic circuits of the vehicle speed control system according to the present invention are set in a control-free setting so as to achieve the vehicle speed control only by previously storing the driving force characteristic map of the tested vehicle.

Additionally, the vehicle speed control system according to the present invention comprises the braking timing automatic determination circuit for automatically determining the braking timing from the vehicle operating condition in the braking control during the vehicle deceleration. Therefore, it becomes possible to smoothly vary the vehicle speed control state from an engine-brake braking state to the foot-brake braking state.

This application is based on a prior Japanese Patent Application No. 2004-119698. The entire contents of the Japanese Patent Application No. 2004-119698 with a filing date of Apr. 15, 2004 are hereby incorporated by reference. The scope of the invention is defined with reference to the following claims.

What is claimed is:

1. A vehicle speed control system for driving a vehicle on a chassis dynamometer, comprising:
a controller having:
a vehicle speed command anticipating section configured to input a vehicle speed command and to output an anticipated vehicle speed command with a delay factor of a control system of the vehicle taken into account;
a driving force calculating section configured to input the anticipated vehicle speed command outputted from the vehicle speed command anticipating section, a vehicle mass, and a running resistance as input data, wherein the driving force calculating section is configured to calculate a driving force from the input data and to output a driving force command;
a driving force characterizing section configured to input the driving force command outputted from the driving force calculating section and a vehicle speed, and configured to output an accelerator opening command using a driving force characteristic map where a relationship between the driving force, the vehicle speed and an accelerator opening is previously stored;
a proportion calculating section configured to amplify a deviation between the vehicle speed command and the vehicle speed, and to output a vehicle speed deviation correction command;
a first adder configured to add the driving force command to the vehicle speed deviation correction command, and to correct the driving force command by the vehicle speed deviation;
an acceleration force calculating section configured to input the vehicle speed, and to calculate an actual acceleration force;
a second adder configured to add the acceleration force outputted from the acceleration force calculating section and a running resistance of a chassis dynamometer load, and configured to output a detection driving force;
a proportional-plus-integral calculator configured to subtract the detection driving force outputted by the second adder from an output of the first adder, to integrate a deviation of the subtraction, and to output a driving-force-correction accelerator opening command; and
an accelerator opening control section configured to input a corrected accelerator opening command that is obtained by adding the driving-force-correction accelerator opening command outputted from the proportional-plus-integral calculator to the accelerator opening command outputted from the driving force characterizing section, and configured to output an accelerator opening, and
wherein the system is configured such that the vehicle speed is controlled by operating an accelerator of the vehicle using the accelerator opening outputted from the accelerator opening control section.

2. The vehicle speed control system as claimed in claim 1, wherein the controller is configured to correct the driving force characteristic map by comparison between the driving force command and the detection driving force.

3. The vehicle speed control system as claimed in claim 1, wherein the controller is configured to directly control the accelerator opening by a feed-forward control system based on the driving force characteristic when the vehicle is accelerated, and to slowly adjust the vehicle speed to a target vehicle speed by a feedback control when the vehicle travels at a constant speed or is in a steady state.

* * * * *